United States Patent [19]

Weber

[11] 4,388,042
[45] Jun. 14, 1983

[54] ROTOR FOR TURBO ENGINES

[75] Inventor: Thomas Weber, Oberursel, Fed. Rep. of Germany

[73] Assignee: Klöckner-Humboldt-Deutz Aktiengesellschaft, Cologne, Fed. Rep. of Germany

[21] Appl. No.: 154,529

[22] Filed: May 29, 1980

[30] Foreign Application Priority Data

May 29, 1979 [DE] Fed. Rep. of Germany ....... 2921704

[51] Int. Cl.³ .............................................. F01D 5/34
[52] U.S. Cl. ................................ 416/198 A; 416/199; 416/244 A
[58] Field of Search ............... 416/199, 198 A, 241 B, 416/200 A, 184, 201 R, 244 A; 415/198.1, 215, 143, 199.1, DIG. 5, 175 R

[56] References Cited

U.S. PATENT DOCUMENTS

| 1,509,653 | 9/1924 | Kaplan | 416/248 |
|---|---|---|---|
| 2,276,077 | 3/1942 | Jacobsen | 415/53 R |
| 2,358,134 | 9/1944 | Tack | 188/218 XL |
| 2,633,776 | 4/1953 | Schenk | 416/244 A |
| 3,071,691 | 1/1963 | Haddad et al. | 415/170 A |
| 3,143,103 | 8/1964 | Zuhn | 60/599 |
| 3,784,324 | 1/1974 | Van Staveren | 417/67 |
| 3,809,493 | 5/1974 | Pilarczyk | 415/199.1 |
| 3,994,630 | 11/1976 | Rodgers | 416/184 X |
| 4,063,850 | 12/1977 | Hueber et al. | 416/244 A X |
| 4,120,618 | 10/1978 | Klaus | 415/198.1 X |

FOREIGN PATENT DOCUMENTS

| 2117067 | 10/1971 | Fed. Rep. of Germany ... 415/198.1 |
| 2503174 | 8/1975 | Fed. Rep. of Germany ... 415/198.1 |
| 1343011 | of 0000 | France .............................. 415/199.1 |
| 124422 | 4/1920 | United Kingdom ................ 416/199 |
| 220271 | 10/1971 | U.S.S.R. ........................... 416/198 A |

Primary Examiner—Everette A. Powell, Jr.
Attorney, Agent, or Firm—Becker & Becker, Inc.

[57] ABSTRACT

A rotor for turbo engines, for example for small gas turbines or turbo-superchargers (exhaust-driven superchargers). The rotor has at least two vane wheels, and a shaft with structural elements rigidly secured thereto. The rotor, with the vane wheels and the shaft, comprises a one-piece high-quality cast part. The rotor may be mechanically or otherwise suitably machined exclusively at sealing surfaces, bearing seats, threads, follower or synchronization toothing or gearing, and other structural elements of the shaft.

1 Claim, 1 Drawing Figure

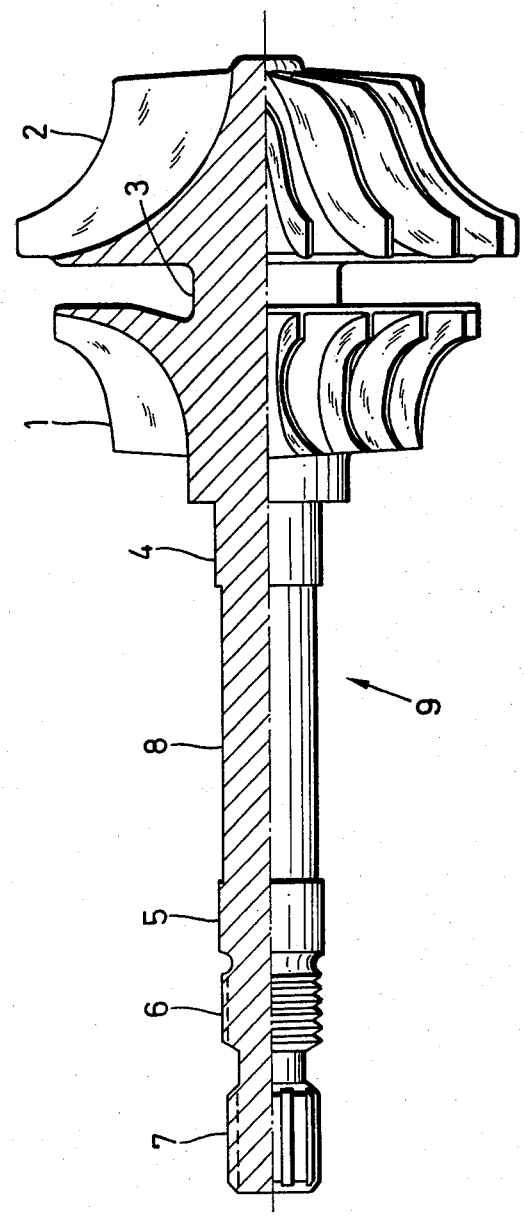

ROTOR FOR TURBO ENGINES

The present invention relates to a rotor for turbo engines, for example for small gas turbines or turbo-superchargers (exhaust-driven superchargers), having at least two vane wheels, and a shaft provided with structural elements rigidly secured thereto.

A gas turbine is known (KHD T 216) having a rotor comprising an assembly of a turbine vane wheel, a compression vane wheel embodied as a hollow cylinder, and a dual-journalled shaft arranged therein, which are braced with each other by a central connecting rod.

The drawbacks of rotors of this type are based essentially in the manner of production thereof. The number of structural parts or components alone increases the finishing cost for the rotor in that aside from parts on the surface of the rotor, internal close-tolerance work, centering, toothing, and the like between the structural parts have to be machined, which are not important for the functionally required outer configuration of the rotor.

Since the individual structural parts are generally made of different materials, adequate tools must be available. Preparation times consequently increase during production. The assembly of the rotor requires further time. Disadvantageous during operation are the mechanical stresses which arise at the separating gaps and result from the different heating and expansion of the structural parts of different materials.

The object of the present invention is to create a functionally satisfactory rotor for turbo engines, such as for small gas turbines or turbo-superchargers (exhaust-driven superchargers), having at least two vane wheels and a shaft provided with structural elements such as sealing surfaces, bearing seats, threads, and synchronization or drive gearing, with the production thereof being simplified in an extremely superior manner by reduction of the surfaces to be machined.

This object, and other objects and advantages of the present invention, will appear more clearly from the following specification in connection with the accompanying drawing, which shows a partially sectioned longitudinal elevational view of an embodiment of a rotor, for turbo engines, having features in accordance with the present invention.

The present invention is characterized primarily in that the rotor, with the vane wheels and the shaft, comprises a unitary, integral, or one-piece high-quality cast part.

A rotor in accordance with the present invention is clearly cheaper and simplified in production when compared with previously built embodiments, and completely satisfies its function thereof in all cases where no extreme turbine inlet temperatures arise.

This is the case for such gas turbines with which the efficiency is subordinate to the production costs. This is the situation when the load rate is low, or the waste heat is supplied for further utilization. In both cases, the fuel consumption is less significant than the plant cost, which can be reduced by utilizing a rotor in accordance with the present invention.

For a turbo-supercharger, this situation is applicable for such motors with which the increase in efficiency or output occurs by means of charging only to a restricted extent.

The production cost is reduced with the inventive rotor with respect to the production of internal close tolerances, centering, toothing, and the like, and with respect to the assembly of the individual structural parts, which leads to a considerable cost reduction of the particular turbo engine.

For production of the inventive rotor, all casting methods and types of production are suitable for casting molds or forms which produce an adequate high-quality casting part, especially when the accuracy of the vane form, and the quality of the surface, is such that the flow passages require no post-machining. The available advantages for simplification are completely utilized by the foregoing features. Different methods are known which offer this advantage. The wax-melting or lost-wax process is advantageous for instance.

In one embodiment according to the teaching of the present invention, the only locations of the rotor which are subjected to a mechanical machining are the sealing surfaces, bearing seats, threads insofar as, for instance, necessary for fixing the bearings on the shaft, and a synchronization or drive gearing or toothing, insofar as a single gear is not pressed or shrunk onto the shaft. The further machining is restricted to the same locations of the rotor. The surface qualities are not subordinate in any way with respect to the constructed rotor; rather the accuracy of the gauge is improved by the machining of the different surfaces in one machining step without re-chucking.

Referring now to the drawing in detail, FIG. 1 shows a compressor rotor or vane wheel 1 having axial inflow and radial discharge, and a turbine vane wheel or rotor 2 having radial inflow and axial discharge, the wheels 1 and 2 being connected integrally (in one piece) with a shaft 8. Between the rotors is located a notch or groove in which the shaft 8 has a machined sealing surface 3. The rotors both hang over on one side of two machined bearing seats 4,5. On the other side of the bearing seats 4,5, the shaft 8 has a thread 6 and a toothing or gearing 7 as further structural elements rigidly secured to the shaft 8.

In summary, the rotor for turbo engines, for example for small gas turbines or turbo superchargers (exhaust-driven superchargers) has at least two vane wheels and a shaft with structural elements rigidly secured thereto. The rotor, with the vane wheels 1,2 and the shaft 8, comprise an integral, one-piece, high-quality cast part. The rotor 9 may comprise a high-quality casting produced in a casting mold or form produced according to the wax-melting or lost-wax process. The rotor 9 may be mechanically or otherwise suitably machined exclusively at sealing surfaces 3, bearing seats 4,5, threads 6, synchronizing or drive toothing or gearing 7, and other structural elements of the shaft 8.

A follower or synchronization toothing or gearing 7 may be arranged on one side, and the vane wheels 1,2 may be arranged in overhanging arrangement on the other side, of two adjacent bearing seats 4, 5 on the shaft 8. A notch or groove may be located between the two vane wheels 1,2, in which notch or groove the shaft 8 has a sealing surface 3. The vane wheel 1 closest to the bearing seats 4,5, may be a compression vane wheel having axial inflow along the shaft 8 and radial discharge; the vane wheel 2 furthest from the bearing seats 4,5 may be a turbine vane wheel having radial inflow and axial discharge with respect to the shaft end.

The present invention is, of course, in no way restricted to the specific disclosure of the specification and drawing, but also encompasses any modifications within the scope of the appended claims.

What I claim is:

1. A rotor for gas turbine machines wherein the turbine machines operate at high speeds and temperatures, the rotor comprising:

a shaft having first and second ends;

a turbine vane wheel consisting of cast, unmachined vanes formed integrally with the shaft by virtue of being cast therewith and projecting radially from the shaft adjacent the first end thereof;

a compressor vane wheel consisting of cast, unmachined vanes formed integrally with the shaft by virtue of being cast therewith and projecting radially from the shaft at a location spaced from and inboard of the turbine vaned wheel;

a sealing surface disposed between the vaned wheels, the sealing surface being integral with the shaft by virtue of being cast therewith and being machined to provide a smooth surface;

a first bearing surface disposed adjacent to and inboard of the compressor vane wheel, the first bearing surface being integral with the shaft by virtue of being cast therewith and being machined to provide a smooth surface;

a second bearing surface spaced from the first bearing surface, the second bearing surface being integral with the shaft by virtue of being cast therewith and being machined to provide a smooth surface;

a helical thread adjacent to and outboard of the second bearing surface, the helical thread having a machined surface, and a spline positioned adjacent to the helical thread and at the second end of the shaft, the spline having a machined surface for receiving a gear;

whereby, a unitary rotor made from a single unit of material is provided, which rotor is relatively inexpensive to manufacture and withstands high thermal stress and high mechanical stress.

* * * * *